Nov. 24, 1970  H. B. TEMPLE  3,541,719

LIVE-FISH BAIT ATTACHMENT

Filed Feb. 12, 1969

INVENTOR.
HENRY B. TEMPLE
BY H.C. Hogencamp
Agent

United States Patent Office 3,541,719
Patented Nov. 24, 1970

3,541,719
LIVE-FISH BAIT ATTACHMENT
Henry B. Temple, Rte. 1, Woodland, Ga. 31836
Filed Feb. 12, 1969, Ser. No. 798,595
Int. Cl. A01k 83/06
U.S. Cl. 43—44.4
4 Claims

ABSTRACT OF THE DISCLOSURE

A device for holding live-fish bait comprising two spaced-apart clamp structures which are removably attached together in a manner to permit free movement therebetween and flexibility of movement of live-fish bait held therein. A first clamp structure is rigidly secured to a fish hook and has an eye extending rearwardly of the hook. A second clamp structure has a wire member extending forwardly and terminating in a hook portion loosely engaging the eye of the first clamp structure. The clamp structures have spaced jaws which may be tied together by a cord or the like to encircle the bait.

---

This invention relates to fishing lures and more particularly to an improved live-fish bait attachment.

The prime purpose of this invention is to provide an improved gear for holding live fish as bait and which can be rigidly attached to any ordinary type of fish hook without requiring modification of the hook itself.

The structure of the device described herein is based upon a study of the anatomy of a fish as taught by the Encyclopedia Brittanica and other texts, and is designed to hold live-fish bait, such as minnows or larger fish, without impaling or otherwise physically injuring them. Further, this device does not hamper the bait-fish's natural swimming and maneuverability because of the fact that such due consideration of the anatomy of the fish has been taken into consideration in the structural design of the device.

Quoting from the texts studied: "The posterior part of a fish, behind the body cavity, consists mainly of bone and muscle and usually has the primary function of propelling the animal through the water." Based upon this, my device is comprise of two separate portions which are removably attached together in such manner as to permit complete flexibility of movement of the live fish-bait, particularly as to its posterior muscle propelling section. In use, the portion which is rigidly attached to the fish hook is positioned forward of the swimming power of the fish and little stress is transmitted to the gear itself. The second portion of my device does not restrict free movement of the posterior propelling part of the fish since it is flexibly attached to the first portion and is free to follow the swimming movement of the fish.

Also of great importance, the device of this invention is so positioned in relation to the fish hook to which it is attached, that it does not in any manner prevent or retard the removal of the hook from the game-fish after it has been caught. This has been an inherent fault of many previously known somewhat similar devices, including that disclosed in one of my previous applications, Ser. No. 521,457, now abandoned, as well as those shown in U.S. Pats. 2,402,730 and 2,602,257. Such devices, while unquestionably effective in catching fish, make it necessary to cut open the fish in order to remove the hook (and the gear) if the bait was swallowed. With the present device, as with any open type of fish hook, the game-fish is hooked in the mouth and the shank of the hook is readily accessible after the fish is caught.

It is to be noted that this device comprises two removably connectable portions. As stated, the complete assembled device attached to a hook is designed especially to hold live fish as bait. However, the portion attached to the hook, independent of the other removable portion, is also useful for holding crickets, grasshoppers, shrimp or the like. Thus, my device is versatile in its usages, dependent upon the type of fishing and the type of bait one desires to employ.

With the foregoing in mind, the principal object of the present invention is to provide an improved attachment for holding live fish-bait with a minimum of harm to the bait.

A second object is to provide a device which will not hamper the natural swimming ability and maneuverability of the live fish-bait.

Still another object is to provide a simple, economical attachment which can be secured to a fish hook in such manner as to not be detrimental to the removal of the hook from the catch.

Other objects will become apparent from the following disclosure, together with the accompanying drawing and the appended claims.

In the drawing.

Like numerals designate like parts in the drawings.

Figure 1:
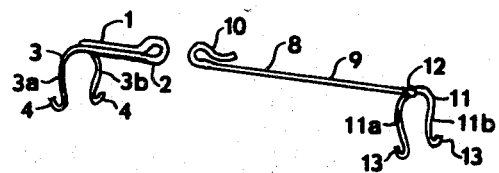
FIG. 1 is a view of the preferred structure of the two separate portions of the live-fish bait attachment.
Figure 2:
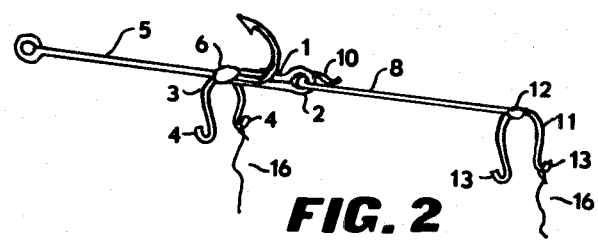
FIG. 2 shows the device of FIG. 1, rigidly attached to a fish hook and with the two portions flexibly atached to each other, as arranged for use.
Figure 3:
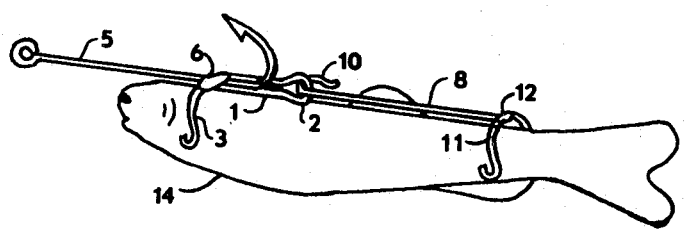
FIG. 3 shows the complete arrangement of FIG. 2 holding a live fish as bait.

FIGS. 1, 2 and 3 show identical details of a preferred construction of the two portions of my device. In FIG. 1, the two portions are shown in separated relationship, while in FIG. 2, the two portions are shown as interconnected in preparation for actual use. In this FIG. 2, the device is also depicted as being firmly and rigidly fastened to a fish hook as by spot welding or otherwise.

In these figures a first or front portion of the structure is designated as 1. This portion 1 might readily be fabricated from a single piece of wire shaped as shown with its central section bent to form an eyelet 2 and the end sections being formed to act as jaws 3a–3b of an open-ended clamp 3. The tip ends of the wire, at the open ends of clamp jaws 3a–3b, are further bent outward and upward as shown to form hooks 4—4 for a purpose which will be later noted. As further shown in FIG. 2, this front portion of my device is then firmly and rigidly affixed to a fish-hook 5 in the approximate relationship shown, as by simple spot welding at point 6. Obviously, other suitable means aside from welding might equally well be used to rigidly fasten portion 1 to fish hook 5 and hooks having two or three barbs could equally well be employed instead of the single-barb hook shown for simplicity.

The second or tail portion of the device is designated 8 in the drawing and comprises a stem 9 having one end bent or formed into a hook 10. At the other or opposite end of stem 9 a second open-ended clamp 11, having jaws 11a–11b is firmly affixed at its center 12 as by welding or other suitable means. As with clamp jaws 3a–3b the tip ends of jaws 11a–11b are likewise bent outward and upward as shown to form hooks 13—13. FIG. 2, with portion 1 rigidly attached to fish hook 5, shows the hook end 10 of tail portion 8 hooked into eyelet 2 of front portion 1. This loosely-formed connection of hook end 10 and eyelet 2 permits complete flexibility between front portion 1 and tail portion 8. Thus, tail portion 8, clamped onto the live-fish bait 14 in the manner shown in FIG. 3, is free to follow the swimming movement of fish 14 without in any way hindering such posterior propulsion movement of fish 14.

As further indicated in FIG. 3, clamp 3 is positioned behind the gills of fish 14 and clamp 11 is preferably positioned back of the dorsal fin and also, therefore, behind the greatest body bulge of fish 14.

Figure 4:
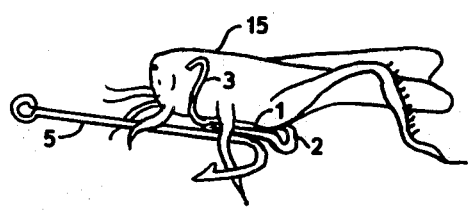
FIG. 4 shows the single front portion of the device, rigidly attached to a fish hook, holding another type of live bait.

FIG. 4 pictures how the front portion 1 of my device, attached to fish hook 5, can be used independently of portion 8 to hold other types of live bait, such as grasshopper 15. This portion of the construction is somewhat similar, with the addition of eyelet 2, to a construction previously shown in my application bearing Ser. No. 521,457 and no claim is herewith made for this front portion 1 except as including an eyelet and in combination with tail portion 8 of the present invention. However, FIG. 4 is included simply in order to show an added usage and the versatility of my present invention.

Returning to FIG. 2 of the drawing it will be noted that wires 16—16 are shown attached to and dangling from the tip ends 4 and 13 of clamp jaws 3 and 11. Although of little or no need when using small live-fish such as minnows as bait, the tip ends of the clamp jaws are purposely formed in such shape in order that a wire, string, cord or the like could easily be used to tie together the two tip ends of each clamp underneath the bait, thus effectively forming a complete loop around the live-fish bait. This is of special usefulness for deep-sea fishing and when larger sizes of live fish are employed as bait, assuring that the bait cannot squirm free of the gear.

It will be obvious to those skilled in the art that certain structural changes might be made, particularly for ease of fabrication and manufacture, without effecting the scope of my invention. For example, the front portion need not be formed from a single piece of wire as shown, but in any convenient manner, even in two pieces, so long as it includes a clamp and an eyelet. Likewise suitable means other than spot welding might equally well be used for rigidly attaching the front portion to a fish hook.

It is also to be noted that this device can conveniently be made in various sizes in order to accommodate live fish-bait of the size required for varying types of fishing—river, lake and/or deep-sea—and depending upon the kind and size of game fish being sought. Therefore, my invention is to be limited only by the claims.

Having thus described my invention, what I claim as new and desire to protect by Letters-Patent is:

1. In combination; a live-fish bait attachment comprising a first clamp structure having an eyelet as a part thereof extending normal to the plane of the clamp structure, said clamps structure being rigidly attached to a fish hook with the eyelet extending beyond the hook bight; an elongated wire structure which includes means at one end for loose attachment to said eyelet; and a second clamp structure firmly affixed to said elongated wire structure at the end opposite from said loose attachment means.

2. The combination as set forth in claim 1 in which the bight of the fish hook is substantially in the plane of said eyelet.

3. The combination as set forth in claim 1 wherein said clamp structures are shaped to generally conform with the shape of the bait held therein.

4. The combination as set forth in claim 3 wherein the clamp structures are open ended with each having outwardly and upwardly bent ends forming hooks whereby the said ends may be tied together to form loops around the said bait.

References Cited
UNITED STATES PATENTS

| | | | |
|---|---|---|---|
| 1,730,957 | 10/1929 | Valiga | 43—44.4 |
| 2,074,540 | 3/1937 | Dorsey | 43—44.6 |
| 2,463,369 | 3/1949 | Finlay et al. | 43—44.4 |

SAMUEL KOREN, Primary Examiner

D. J. LEACH, Assistant Examiner

U.S. Cl. X.R.

43—44.6, 44.8